(12) United States Patent
He

(10) Patent No.: US 12,724,810 B2
(45) Date of Patent: Sep. 1, 2026

(54) QUESTION ANSWERING METHOD BASED ON LARGE MODEL, ELECTRONIC DEVICE, AND STORAGE MEDIUM

(71) Applicant: BAIDU ONLINE NETWORK TECHNOLOGY (BEIJING) CO., LTD., Beijing (CN)

(72) Inventor: Bolei He, Bejing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 18/979,343

(22) Filed: Dec. 12, 2024

(65) Prior Publication Data

US 2026/0087055 A1 Mar. 26, 2026

(30) Foreign Application Priority Data

Sep. 23, 2024 (CN) ........................ 202411329259.0

(51) Int. Cl.
*G06F 16/338* (2019.01)
*G06F 16/334* (2025.01)
(Continued)

(52) U.S. Cl.
CPC ........ *G06F 16/338* (2019.01); *G06F 16/3344* (2019.01); *G06F 16/383* (2019.01)

(58) Field of Classification Search
None
See application file for complete search history.

(56) References Cited

U.S. PATENT DOCUMENTS 9,208,223 B1 * 12/2015 Patil .................... G06F 16/2291
12,596,867 B2 * 4/2026 Ghoneim ............. G06F 16/345
(Continued)

FOREIGN PATENT DOCUMENTS

CN 116737908 A 9/2023
CN 117591654 A 2/2024
(Continued)

OTHER PUBLICATIONS

Thain et al. U.S. Appl. No. 63/605,446 provisional application of US 20250181435, Dec. 1, 2023 (Year: 2023).*
(Continued)

*Primary Examiner* — Polina G Peach
(74) *Attorney, Agent, or Firm* — Osha Bergman Watanabe & Burton LLP

(57) ABSTRACT

A question answering method based on a large model is performed by an electronic device. The method includes: determining a first result corresponding to a query statement based on a first large model, in which the first result includes a first response corresponding to the query statement, a first response logic corresponding to the first response, and first context knowledge corresponding to the first response; determining a retrieval result corresponding to the query statement by retrieving in a database based on the query statement; determining a type of a knowledge conflict between the first result and the retrieval result; and determining a target response corresponding to the query statement based on the first result, the retrieval result, and the type of the knowledge conflict.

15 Claims, 5 Drawing Sheets determining a first result corresponding to a query statement based on a first large model, in which the first result includes a first response corresponding to the query statement, a first response logic corresponding to the first response, and first context knowledge corresponding to the first response — S101 determining at least one retrieval result corresponding to the query statement by retrieving in a database based on the query statement — S102 determining a type of a knowledge conflict between the first result and the retrieval result — S103 determining a target response corresponding to the query statement based on the first result, the retrieval result, and the type of the knowledge conflict — S104

(51) Int. Cl.
*G06F 16/383* (2019.01)
*G06F 16/30* (2019.01)

(56) References Cited

U.S. PATENT DOCUMENTS

| | | | | |
|---|---|---|---|---|
| 2012/0066167 | A1* | 3/2012 | Fokoue | G06N 5/02 706/45 |
| 2015/0081657 | A1* | 3/2015 | Yi | G06F 16/3338 707/706 |
| 2022/0164643 | A1* | 5/2022 | Charnock | G06N 3/08 |
| 2024/0095468 | A1* | 3/2024 | Tunstall-Pedoe | G06F 40/30 |
| 2024/0289395 | A1* | 8/2024 | Zhou | G06F 16/9532 |
| 2024/0330342 | A1* | 10/2024 | Chhatpar | G06F 16/3347 |
| 2024/0338361 | A1* | 10/2024 | Hazel | G06F 16/2423 |
| 2024/0362423 | A1* | 10/2024 | Agrawal | G06N 5/04 |
| 2024/0386207 | A1* | 11/2024 | Emrey | G06F 40/295 |
| 2024/0419912 | A1* | 12/2024 | Somech | G06F 40/279 |
| 2025/0045256 | A1* | 2/2025 | Gottlob | G06F 16/2365 |
| 2025/0086211 | A1* | 3/2025 | Bolcer | G06F 16/3344 |
| 2025/0094025 | A1* | 3/2025 | Maschmeyer | G06N 3/047 |
| 2025/0097171 | A1* | 3/2025 | Hu | G06F 8/35 |
| 2025/0103800 | A1* | 3/2025 | Ghoneim | G06F 16/345 |
| 2025/0111169 | A1* | 4/2025 | Srinivasan | G06N 3/08 |
| 2025/0111220 | A1* | 4/2025 | Jones | G06F 16/243 |
| 2025/0181435 | A1* | 6/2025 | Thain | G06F 11/0751 |
| 2025/0225337 | A1* | 7/2025 | Yim | G06F 40/40 |
| 2025/0307572 | A1* | 10/2025 | Shtar | G06F 40/30 |

FOREIGN PATENT DOCUMENTS

| | | |
|---|---|---|
| CN | 118277522 A | 7/2024 |
| CN | 118606348 A | 9/2024 |

OTHER PUBLICATIONS

Thain et al. Appendix A, Dec. 1, 2023 (Year: 2023).*
Ziwei Ji et al. “Survey of Hallucination in Natural Language Generation”, Mar. 2023, ACM Computing Surveys, vol. 55, No. 12, Article 248. (Year: 2023).*

* cited by examiner

QUESTION ANSWERING METHOD BASED ON LARGE MODEL, ELECTRONIC DEVICE, AND STORAGE MEDIUM

CROSS-REFERENCE TO RELATED APPLICATION

The present application is based upon and claims priority to Chinese Patent Application No. 2024113292590, filed on Sep. 23, 2024, the entire contents of which are incorporated herein by reference.

TECHNICAL FIELD

The disclosure relates to the field of computer technology, in particular to artificial intelligent technical fields such as natural language processing, intelligent question answering, and large models etc., and in particular to question answering method and apparatus based on a large model, an electronic device and a storage medium.

CONTEXT

In the field of natural language processing, a system based on a retrieval augmented generation (RAG) model is widely used in tasks such as text generation and question answering systems. The RAG model generates more accurate answers by combining parameter knowledge internalized in a large language model (LLM) with external knowledge retrieved from an external database. However, when complex long tailed recognition is handled, there may be conflicts between the parameter knowledge of the model and the external knowledge, which may result in inaccurate generated answers.

SUMMARY

According to a first aspect of the disclosure, a question answering method based on a large model is performed by an electronic device. The method includes: determining a first result corresponding to a query statement based on a first large model, in which the first result includes a first response corresponding to the query statement, a first response logic corresponding to the first response, and first context knowledge corresponding to the first response; determining a retrieval result corresponding to the query statement by retrieving in a database based on the query statement; determining a type of a knowledge conflict between the first result and the retrieval result; and determining a target response corresponding to the query statement based on the first result, the retrieval result, and the type of the knowledge conflict.

According to a second aspect of the disclosure, an electronic device is provided. The electronic device includes: at least one processor; and a memory communicatively coupled to the at least one processor and storing instructions executable by the at least one processor. When the instructions are executed by the at least one processor, the at least one processor is enabled to perform the question answering method based on a large model as described in the first aspect.

According to a third aspect of the disclosure, a computer readable storage medium storing computer instructions is provided. The computer instructions are caused to enable a computer to perform the question answering method based on a large model as described in the first aspect.

BRIEF DESCRIPTION OF THE DRAWINGS

The accompanying drawings are used for a better understanding of the disclosure and do not constitute a limitation of the disclosure.

FIG. 1 is a flowchart illustrating a question answering method based on a large model according to an embodiment of the disclosure.

DETAILED DESCRIPTION

Figure 2:
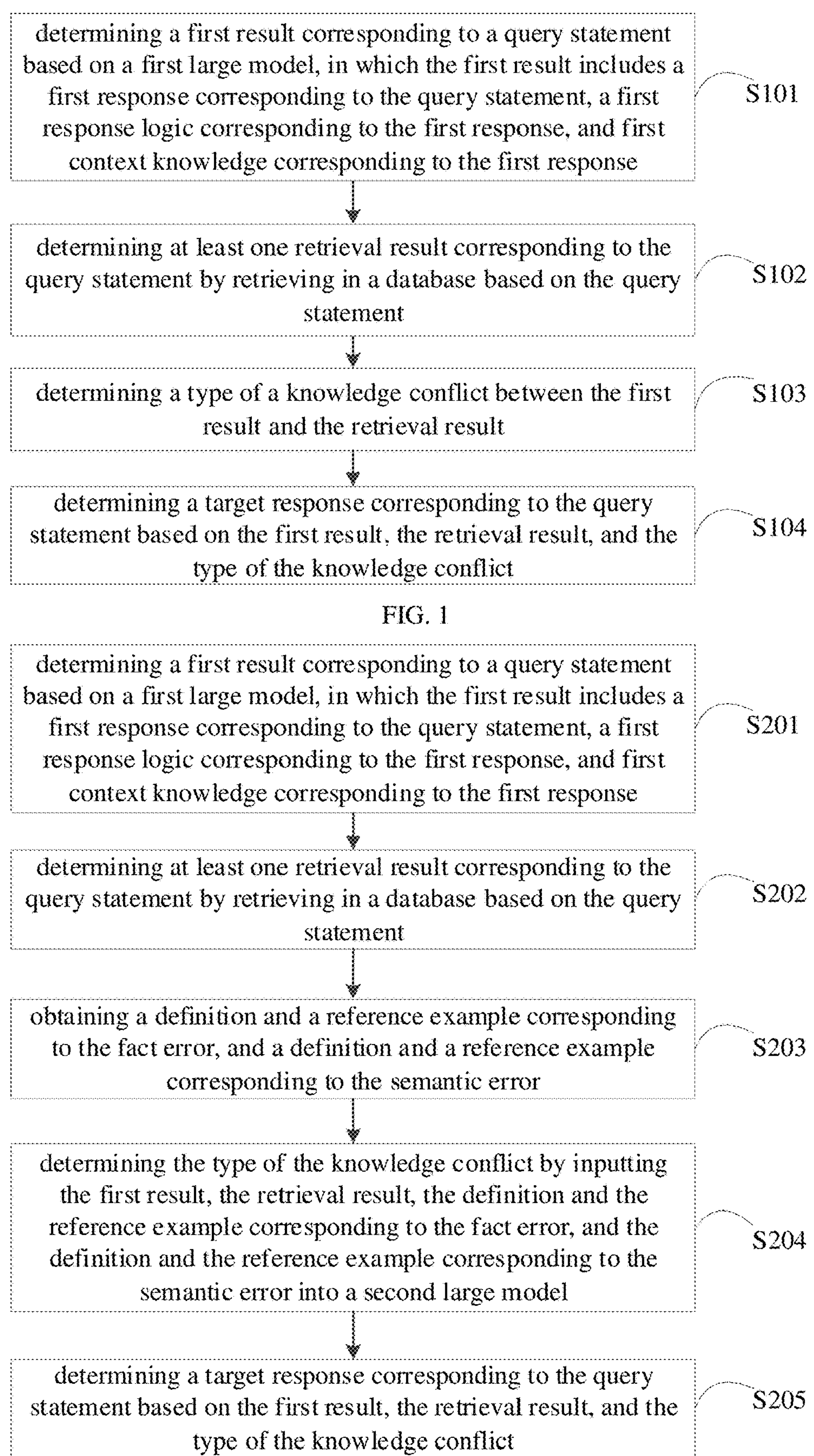
FIG. 2 is a flowchart illustrating a question answering method based on a large model according to another embodiment of the disclosure.

Exemplary embodiments of the disclosure are described hereinafter in conjunction with the accompanying drawings, which include various details of the embodiments of the disclosure in order to aid in understanding, and should be considered exemplary only. Accordingly, one of ordinary skill in the art should recognize that various changes and modifications may be made to the embodiments described herein without departing from the scope of the disclosure. Similarly, descriptions of well-known features and structures are omitted from the following description for the sake of clarity and brevity.

The disclosure relates to the artificial intelligent (AI) technical fields such as natural language processing, intelligent question answering, and large models etc.

The AI is a new technological science that studies and develops theories, methods, technologies, and application systems for simulating, extending, and expanding human intelligence.

Deep Learning (DL) is a process of learning intrinsic patterns and hierarchical representations of sample data. The information obtained during learning processes is of great help in interpreting data such as text, images, and sound. The ultimate goal of DL is to enable machines to have analytical learning capabilities like humans, capable of recognizing data such as text, images, and sound.

An intelligent question answering system aims to design and develop a system that may parse, understand, and answer natural language questions provided by users. The core of the system lies in using natural language processing technology to analyze and understand questions input by the users, extract key information and intentions of the questions, and finally generate and return accurate, concise, and direct answers by matching or reasoning with a knowledge base.

The large model, also known as the Foundation Model, extracts knowledge from billion-level corpora or images, learns and produces a large model with billion-level parameters.

Parameter knowledge conflict: since the parameter knowledge is internalized in the LLM, the model may provide answers with high accuracy for high-frequency questions; however, the parameter knowledge often cannot effectively provide a support for the long tailed recognition and uncommon scenarios, and incorrect answers may even be produced. That is, the parameter knowledge conflict refers to a conflict phenomenon that occurs during text generation by the knowledge internalized in the LLM. The LLM learns a large amount of general knowledge during pre-training, and the general knowledge is encoded into parameters of the model, which is thus called "parameter knowledge".

External knowledge conflict: when using external knowledge, the model may retrieve content that conflicts with internalized knowledge, resulting in logical contradictions or knowledge errors in the generated results, especially in black box models, where such conflicts are difficult to identify and correct. That is, the external knowledge conflict refers to a conflict phenomenon that occurs in the RAG model when information retrieved from an external knowledge base conflicts with the parameter knowledge within the LLM. The external knowledge usually comes from a real-time retrieval, which may include literature, databases, web pages, etc.

The parameter knowledge conflict and the external knowledge conflict are two main challenges that the RAG model faces in the process of knowledge fusion. The former comes from limitations and inconsistencies of the knowledge internalized in the model, while the latter comes from a conflict between dynamic and extensive external knowledge and internalized knowledge. Resolving these conflicts is key to improving the performance of the RAG model in the complex long tailed recognition.

In the technical solutions of the disclosure, the acquisition, storage, and application of user personal information comply with relevant laws and regulations, and do not violate public order and good customs.

The question answering method and apparatus based on a large model, the electronic device and the storage medium according to embodiments of the disclosure are described hereafter with reference to the accompanying drawings.

In embodiments of the disclosure, a first result corresponding to a query statement is determined based on a first large model, a retrieval result corresponding to the query statement is determined based on a database, and the first result and the retrieval result are processed to obtain a target response based on a type of a knowledge conflict between the first result and the retrieval result, which may avoid the influence of the knowledge conflict between the first result and the retrieval result on the target response and may thus improve the accuracy of the target response determined.

It needs to be noted that, the execution body of the question answering method based on a large model in the embodiments is the question answering apparatus based on a large model, which may be implemented in software and/or hardware and may be configured in an electronic device. The electronic device may include but be not limited to a terminal, a server, and the like.

FIG. 1 is a flowchart illustrating a question answering method based on a large model according to an embodiment of the disclosure.

As illustrated in FIG. 1, the question answering method based on a large model includes the following steps at S101-S104.

At S101, a first result corresponding to a query statement is determined based on a first large model, in which the first result includes a first response corresponding to the query statement, a first response logic corresponding to the first response, and first context knowledge corresponding to the first response.

The first result may be a result obtained by processing the query statement based on the first large model.

The first response may be a response corresponding to the query statement.

The first response logic may be a response logic used for generating the first response by the first large model.

The first context knowledge may be context knowledge based on which the first large model generates the first response.

The large model may be a model that provides a response for a user question, which may be a preset model of any type and any structure. For example, the first large model may be a model composed of both a deep neural network and a LLM fine-tuning model, etc., which is not limited in the disclosure.

At S102, at least one retrieval result corresponding to the query statement is determined by retrieving in a database based on the query statement.

The database may include web pages, literature, pre-built knowledge bases, etc.

In some embodiments, a plurality of retrieval results corresponding to the query statement may be obtained by retrieving in different databases based on the query statement.

In some embodiments, retrieving may also be performed in one database based on the query statement to obtain at least one retrieval result corresponding to one query statement.

At S103, a type of a knowledge conflict between the first result and the retrieval result is determined.

In some embodiments, the type of the knowledge conflict may include a semantic error, a fact error, a grammatical error, and so on, which is not limited in the disclosure.

For example, if the first result is "the country A was founded in 1776" and the retrieval result is "the country A was founded in 1876", then the type of the knowledge conflict between the first result and the retrieval result is a fact error.

For example, if the first result is "the airplane and the Wright are brothers" and the retrieval result is "the inventors of the airplane are the Wright brothers", then the type of the knowledge conflict between the first result and the retrieval result is a semantic error.

In some embodiments, the conflict between the first result and the retrieval result may be identified based on a definition corresponding to a type of each knowledge conflict, in order to determine the type of the knowledge conflict between the first result and the retrieval result.

In some embodiments, if there are a plurality of retrieval results, a conflict between the first result and each retrieval result is identified to obtain a type of a knowledge conflict between each retrieval result and the first result. Then, the type of the knowledge conflict with the highest quantity is determined as the type of the knowledge conflict between the first result and the retrieval result.

For example, if a number of retrieval results is 5, a number of knowledge conflicts with a type being the grammar error is 3, a number of knowledge conflicts with a type being the semantic error is 1, and a number of knowledge conflicts with a type being the fact error is 1, then it is determined that the type of the knowledge conflict between the first result and the retrieval result is the grammar error.

At S104, a target response corresponding to the query statement is determined based on the first result, the retrieval result, and the type of the knowledge conflict.

In some embodiments, after determining the type of the knowledge conflict, the first result and the retrieval result may be processed based on the type of the knowledge conflict to determine the target response corresponding to the query statement.

In the embodiments of the disclosure, the first result corresponding to the query statement is first determined based on the first large model, in which the first result includes the first response corresponding to the query statement, the first response logic corresponding to the first response, and the first context knowledge corresponding to the first response; the at least one retrieval result corresponding to the query statement is then determined by retrieving in the database based on the query statement; the type of the knowledge conflict between the first result and the retrieval result is further determined; and the target response corresponding to the query statement is finally determined based on the first result, the retrieval result, and the type of the knowledge conflict. Thus, the first result corresponding to the query statement is determined based on the first large model, a retrieval result corresponding to the query statement is determined based on a database, and the first result and the retrieval result are processed to obtain the target response based on the type of the knowledge conflict between the first result and the retrieval result, which may avoid the influence of the knowledge conflict between the first result and the retrieval result on the target response and may thus improve the accuracy of the target response determined.

FIG. 2 is a flowchart illustrating a question answering method based on a large model according to another embodiment of the disclosure.

As illustrated in FIG. 2, the question answering method based on a large model includes the following steps at S201-S205.

At S201, a first result corresponding to a query statement is determined based on a first large model, in which the first result includes a first response corresponding to the query statement, a first response logic corresponding to the first response, and first context knowledge corresponding to the first response.

At S202, at least one retrieval result corresponding to the query statement is determined by retrieving in a database based on the query statement.

The specific implementation forms of steps S201 to S202 may refer to the detailed descriptions in other embodiments of the disclosure, which will not be repeated here.

At S203, a definition and a reference example corresponding to the fact error, and a definition and a reference example corresponding to the semantic error are obtained.

In some embodiments of the disclosure, the type of the knowledge conflict includes at least one of a fact error and a semantic error. Therefore, in the embodiments of the disclosure, the first result and the retrieval result corresponding to a plurality of types of the knowledge conflicts may be processed to obtain the target response.

It needs to be noted that the fact error and the semantic error are difficult problems for the large model to solve when the target response is generated based on the external knowledge and the parameter knowledge.

For example, a reference example of the fact error may be that there is a fact error between "the country A was founded in 1776" and "the country A was founded in 1876".

For example, a reference example of the semantic error may be that there is a semantic error between "the airplane and the Wright are brothers" or "the inventors of the airplane are the Wright brothers".

There may be one or more reference examples of the fact error, which is not limited in the disclosure.

There may be one or more reference examples of the semantic error, which is not limited in the disclosure.

At S204, the type of the knowledge conflict is determined by inputting the first result, the retrieval result, the definition and the reference example corresponding to the fact error, and the definition and the reference example corresponding to the semantic error into a second large model.

The second large model may be the same as or different from the first large model, which is not limited in the disclosure.

The definition and the reference example corresponding to the fact error are used to indicate what kind of knowledge conflicts are the fact errors to the second large model, so that the second large model may determine whether there is a fact error between the first result and the retrieval result.

The definition and the reference example corresponding to the semantic error are used to indicate what kind of knowledge conflicts are the semantic errors to the second large model, so that the second large model may determine whether there is a semantic error between the first result and the retrieval result.

At S205, a target response corresponding to the query statement is determined based on the first result, the retrieval result, and the type of the knowledge conflict.

In some embodiments, when the type of the knowledge conflict is the semantic error, the first result, the retrieval result, the type of the knowledge conflict, and the definition and the reference example corresponding to the semantic error are input into a third large model to determine the target response. Thus, the first result, the retrieval result, and the type of the knowledge conflict, may be processed based on the third major model, which may quickly and accurately determine the target response corresponding to the query statement.

The third large model may be the same as or different from the first and second large models, which is not limited in the disclosure.

The type of the knowledge conflict is input into the third large model, which is used to indicate there is the semantic error between the first result and the retrieval result to the third large model, and the semantic error between the first result and the retrieval result is then processed to obtain the target response.

In the embodiments of the disclosure, the first result corresponding to the query statement is determined based on the first large model; the at least one retrieval result corresponding to the query statement is determined by retrieving in the database based on the query statement; the first result, the retrieval result, the definition and the reference example corresponding to the fact error, and the definition and the reference example corresponding to the semantic error are input into the second large model to determine the type of the knowledge conflict; the target response corresponding to the query statement is finally determined based on the first result, the retrieval result, and the type of the knowledge conflict. Thus, by combining the definition and the reference example corresponding to the fact error, and the definition and the reference example corresponding to the semantic error, the second large model may be indicated to identify whether there is a fact or semantic conflict between the first result and the retrieval result. This may quickly and accurately determine the type of the knowledge conflict between the first result and the retrieval result, and then accurately determine the target response based on the type of the knowledge conflict.

Figure 3:
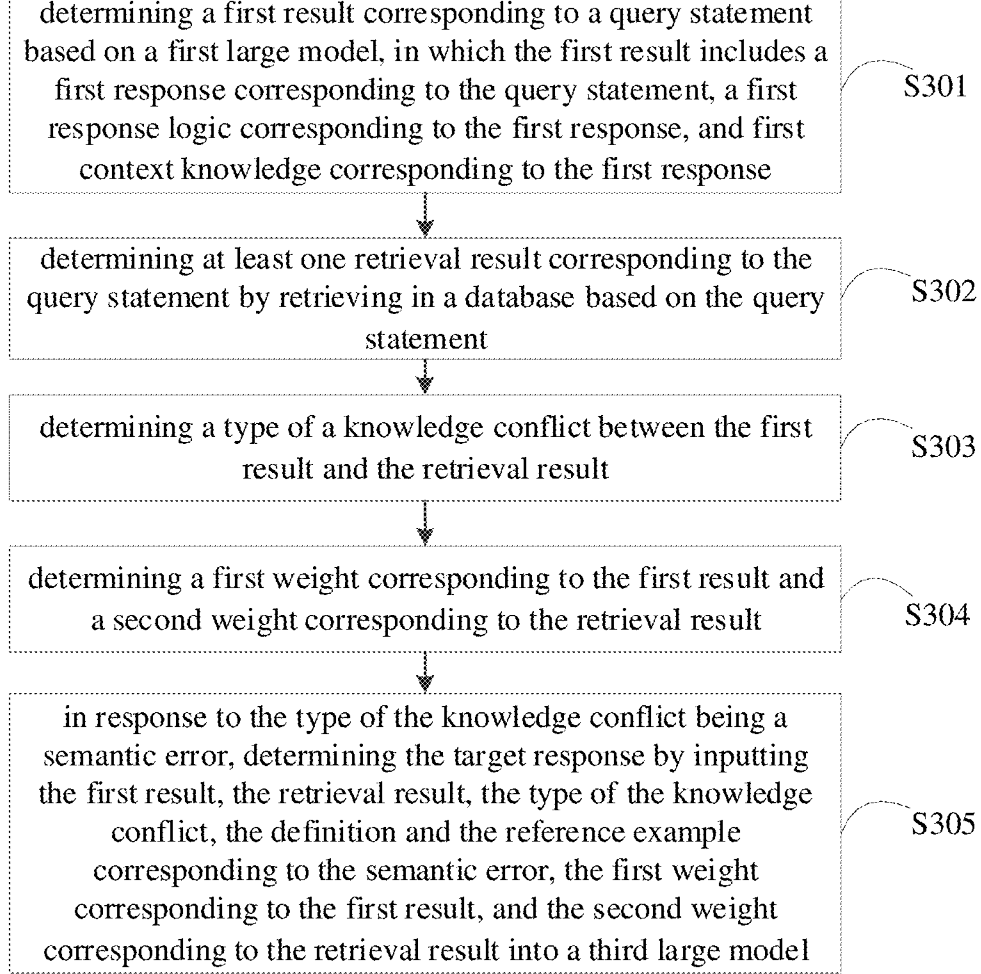
FIG. 3 is a flowchart illustrating a question answering method based on a large model according to another embodiment of the disclosure.

FIG. 3 is a flowchart illustrating a question answering method based on a large model according to another embodiment of the disclosure. As illustrated in FIG. 3, the question answering method based on a large model includes the following steps at S301-S305.

At S301, a first result corresponding to a query statement is determined based on a first large model, in which the first result includes a first response corresponding to the query statement, a first response logic corresponding to the first response, and first context knowledge corresponding to the first response.

At S302, at least one retrieval result corresponding to the query statement is determined by retrieving in a database based on the query statement.

At S303, a type of a knowledge conflict between the first result and the retrieval result is determined.

The specific implementation forms of steps S301 to S303 may refer to the detailed descriptions in other embodiments of the disclosure, which will not be repeated here.

At S304, a first weight corresponding to the first result and a second weight corresponding to the retrieval result are determined.

In some embodiments, the first weight and the second weight may be preset, which is not limited in the disclosure.

In some embodiments of the disclosure, the first weight corresponding to the first result is determined based on a parameter amount corresponding to the first large model, in which the parameter amount is proportional to the first weight, and the second weight is determined based on the first weight. Thus, the first weight corresponding to the first result may be determined based on the parameter amount of the first large model, and the second weight corresponding to the retrieval result may be then determined. The accuracy of generating the first result by the first large model may be improved based on the parameter amount of the first large model, and the first weight corresponding to the first result and the second weight corresponding to the retrieval result may be accurately determined.

The parameter amount of the first large model may be a total number of parameters contained in the first large model. It needs to be noted that the more parameters the first large model has, the more training data it requires, the more knowledge it learns, and the higher the accuracy of the generated first result.

A sum of the first weight and the second weight may be 1, which is not limited in the disclosure.

In some embodiments, the larger the number of parameters in the first large model, the larger the corresponding first weight.

At S305, in response to the type of the knowledge conflict being a semantic error, the target response is determined by inputting the first result, the retrieval result, the type of the knowledge conflict, the definition and the reference example corresponding to the semantic error, the first weight corresponding to the first result, and the second weight corresponding to the retrieval result into a third large model.

The first weight corresponding to the first result and the second weight corresponding to the retrieval result are input into the third large model, which may indicate the accuracy of the first result and the accuracy of the retrieval result to the third large model, so that the third large model may process the first result and the retrieval result based on the first weight and the second weight, thereby enabling the third large model to output a more accurate target response.

In the embodiments of the disclosure, the first result corresponding to the query statement is first determined based on the first large model; the at least one retrieval result corresponding to the query statement is then determined by retrieving in the database based on the query statement; the type of the knowledge conflict between the first result and the retrieval result is further determined; the first weight corresponding to the first result and the second weight corresponding to the retrieval result are finally determined; and in the case where the type of the knowledge conflict is the semantic error, the first result, the type of the knowledge conflict, the definition and the reference example corresponding to the semantic error, the first weight corresponding to the first result, and the second weight corresponding to the retrieval result are input into the third large model to determine the target response. Therefore, in the case where the type of the knowledge conflict between the first result and the retrieval result is the semantic error, the third large model may be indicated to process the first result and the retrieval result to obtain the target response based on the first weight corresponding to the first result, the second weight corresponding to the retrieval result, and the type of the knowledge conflict, so as to more accurately determine the target response corresponding to the query statement.

Figure 4:
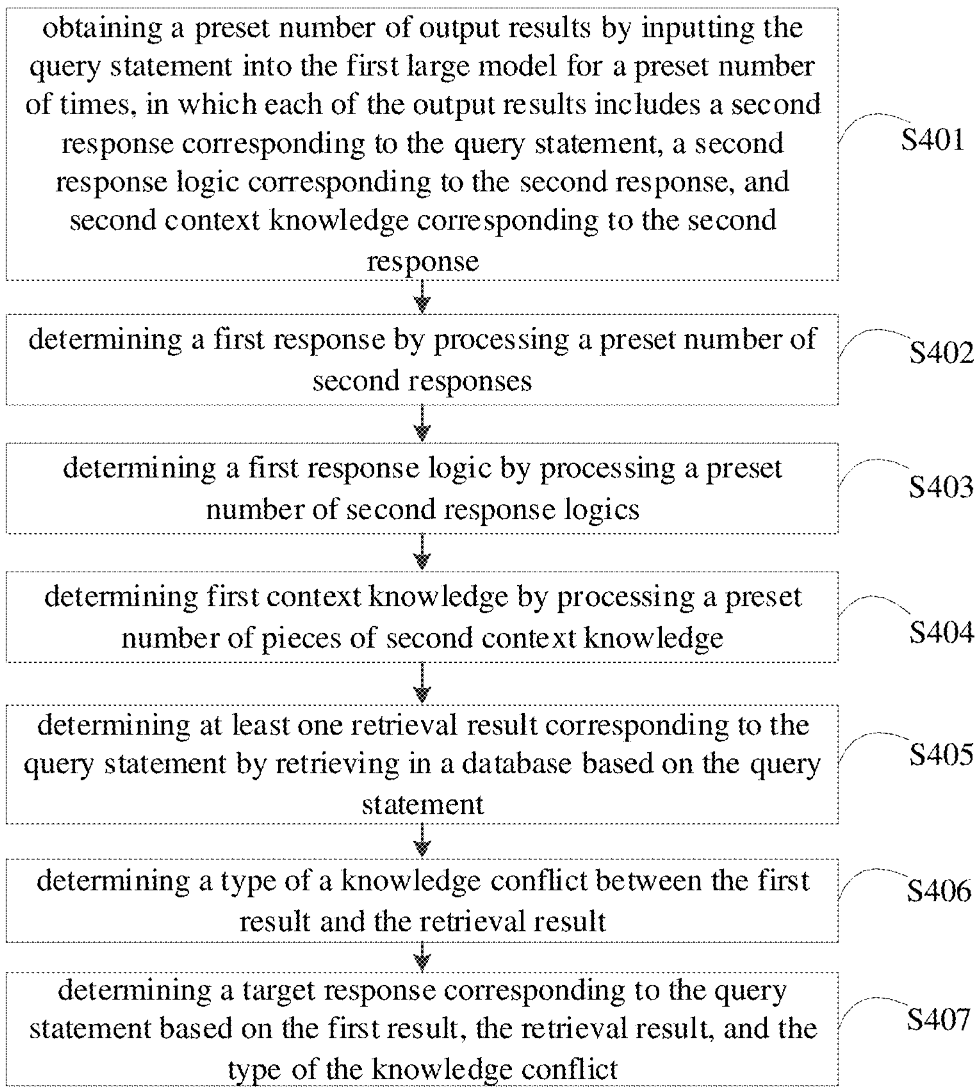
FIG. 4 is a flowchart illustrating a question answering method based on a large model according to another embodiment of the disclosure.

FIG. 4 is a flowchart illustrating a question answering method based on a large model according to another embodiment of the disclosure. As illustrated in FIG. 4, the question answering method based on a large model includes the following steps at S401-S407.

At S401, a preset number of output results are obtained by inputting the query statement into the first large model for a preset number of times, in which each of the output results includes a second response corresponding to the query statement, a second response logic corresponding to the second response, and second context knowledge corresponding to the second response.

It needs to be noted that due to the large amount of parameter knowledge learned by the first large model, different results may be output by the first large model when processing the same query statement. In the embodiments of the disclosure, the query statement may be output to the first large model for the plurality of times to obtain a plurality of output results.

The second response logic may determine a response logic used for generating the second response by the first large model.

The second context knowledge is knowledge based on which the first large model determines the second response.

At S402, the first response is determined by processing a preset number of second responses.

In some embodiments, the first response is determined by cross validation of a preset number of second responses.

In some embodiments, the preset number of second responses may be input into a fourth large model, so that the fourth large model summarizes the preset number of second responses to obtain the first response.

At S403, the first response logic is determined by processing a preset number of second response logics.

In some embodiments, the first response logic is determined by cross validation of the preset number of second response logics.

In some embodiments, the preset number of second response logics may be input into the fourth large model, so that the fourth large model summarizes the preset number of second response logics to obtain the first response logic.

At S404, the first context knowledge is determined by processing a preset number of pieces of second context knowledge.

In some embodiments, the first context knowledge is determined by cross validation of the preset number of pieces of second context knowledge.

In some embodiments, the preset number of pieces of second context knowledge may be input into the fourth large model, so that the fourth large model summarizes the preset number of pieces of second context knowledge to obtain the first context knowledge.

In some embodiments, the preset number of first responses, the preset number of second responses, and the preset number of pieces of second context knowledge are input into the fourth large model to determine the first response, the first response logic, and the first context knowledge. Thus, the plurality of output results for the query statement in the large third model may be quickly and accurately processed based on the fourth large model to obtain the first response, the first response logic, and the first context knowledge.

At S405, at least one retrieval result corresponding to the query statement is determined by retrieving in a database based on the query statement.

At S406, a type of a knowledge conflict between the first result and the retrieval result is determined.

The specific implementation forms of steps S405 to S406 may refer to the detailed descriptions in other embodiments of the disclosure, which will not be repeated here.

At S407, a target response corresponding to the query statement is determined based on the first result, the retrieval result, and the type of the knowledge conflict.

In some embodiments, when in the case where the output result includes a confidence level corresponding to the second response, a first weight corresponding to the first result may be determined based on a preset number of confidence levels. Then, a second weight corresponding to the retrieval result may be obtained. Finally, in the case where the type of the knowledge conflict is a semantic error, the target response is determined by inputting the retrieval result, the first result, the type of the knowledge conflict, the definition and the reference example corresponding to the semantic error, the first weight corresponding to the first result, and the second weight corresponding to the retrieval result into a third large model. Thus, the first weight for the first result may be dynamically determined based on the confidence level of each output result of the first large model, making the determined first weight more accurate and thus making the determined target response more accurate.

The confidence level may be a confidence level of the second response corresponding to the query statement output by the first large model.

In some embodiments, an average value or a variance value of the preset number of confidence levels may be determined as the first weight.

In some embodiments, the second weight may be fixed and unchanged, or the second weight may vary based on the first weight. For example, as the first weight increases, the second weight decreases.

In the embodiments of the disclosure, the query statement may be inputted into the first large model for the preset number of times to obtain the preset number of output results, each of which includes the second response corresponding to the query statement, the second response logic corresponding to the second response, and the second context knowledge corresponding to the second response. Then, the preset number of second responses may be processed to determine the first response, the preset number of second response logics may be processed to determine the first response logic, the preset number of pieces of second context knowledge may be processed to determine the first context knowledge. Then, the at least one retrieval result corresponding to the query statement is determined by retrieving in the database based on the query statement; the type of the knowledge conflict between the first result and the retrieval result is determined; and the target response corresponding to the query statement is finally determined based on the first result, the retrieval result, and the type of the knowledge conflict. Thus, the second response logics, and the pieces of second context knowledge corresponding to the query statement may be obtained for the plurality of times through the first large model; the first response is determined by cross validation of the preset number of second responses, the first response logic is determined by cross validation of the preset number of second response logics, and the first context knowledge is determined by cross validation of the preset number of pieces of second context knowledge. This may solve the parameter knowledge conflict of the first large model, make the determined first response, first response logic, and first context knowledge more accurate, and further improve the accuracy of the determined target response.

Figure 5:
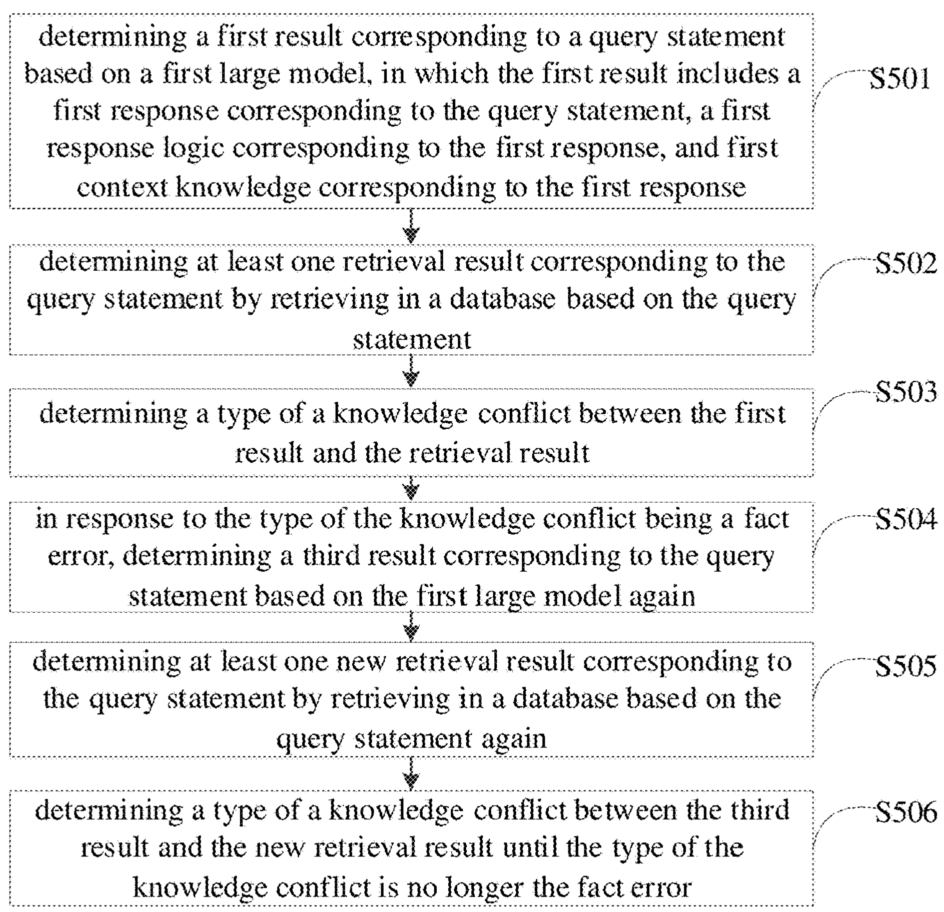
FIG. 5 is a flowchart illustrating a question answering method based on a large model according to another embodiment of the disclosure.

In the embodiments of the disclosure, as illustrated in FIG. 5, the question answering method based on a large model includes the following steps at S501-S506.

At S501, a first result corresponding to a query statement is determined based on a first large model, in which the first result includes a first response corresponding to the query statement, a first response logic corresponding to the first response, and first context knowledge corresponding to the first response.

At S502, at least one retrieval result corresponding to the query statement is determined by retrieving in a database based on the query statement.

At S503, s type of s knowledge conflict between the first result and the retrieval result is determined.

The specific implementation forms of steps S501 to S503 may refer to the detailed descriptions in other embodiments of the disclosure, which will not be repeated here.

At S504, in response to the type of the knowledge conflict being a fact error, a third result corresponding to the query statement is determined again based on the first large model.

The third result includes a third response corresponding to the query statement, a third response logic corresponding to the third response, and third context knowledge corresponding to the third response.

In some embodiments, the query statement may be input into the first large model again to obtain the third result.

In some embodiments, the query statement is inputted into the first large model for a preset number of times to obtain a preset number of output results, each of which includes a fourth response corresponding to the query statement, a fourth response logic corresponding to the fourth response, and fourth context knowledge corresponding to the fourth response; the preset number of fourth responses are processed to determine the third response; the preset number of fourth response logics are processed to determine the third response logic; and the preset number of pieces of fourth context knowledge are processed to determine the third context knowledge.

At S505, at least one new retrieval result corresponding to the query statement is determined by retrieving in a database based on the query statement again.

The database used for second retrieving may be the same or different from the database used for first retrieving, which is not limited in the disclosure.

The new retrieval result may be the same or different from the retrieval result obtained from the first retrieving, which is not limited in the disclosure.

At S506, a type of a knowledge conflict between the third result and the new retrieval result is determined until the type of the knowledge conflict is no longer the fact error.

The specific implementation form of determining the type of the knowledge conflict between the third result and the new retrieval result may refer to the description of determining the type of the knowledge conflict between the first result and the retrieval result in other embodiments, which will not be repeated here.

It needs to be noted that the type of the knowledge conflict is the fact error, indicating that there is a fact error in the first result or in the retrieval result, making it difficult to determine whether the fact error is present in the first result or the retrieval result. Therefore, in the embodiments of the disclosure, the third result corresponding to the query statement may be obtained again based on the first large model, and the query statement may be retrieved again in the database to obtain a new retrieval result, until the type of the knowledge conflict between the obtained third result and the new retrieval result is no longer the fact error. Thus, the target response corresponding to the query statement may be accurately determined.

In the embodiments of the disclosure, the first result corresponding to the query statement is determined based on the first large model, in which the first result includes the first response corresponding to the query statement, the first response logic corresponding to the first response, and the first context knowledge corresponding to the first response; the at least one retrieval result corresponding to the query statement is then determined by retrieving in the database based on the query statement; the type of the knowledge conflict between the first result and the retrieval result is determined; finally, in the case where the type of the knowledge conflict is the fact error, the third result corresponding to the query statement is obtained again based on the first large model, the at least one new retrieval result corresponding to the query statement is determined by retrieving in the database based on the query statement again, the type of the knowledge conflict between the third result and the new retrieval result is determined until the type of the knowledge conflict is no longer the fact error. Thus, in the case where the type of the knowledge conflict between the first result and the retrieval result is determined, the third result and the new retrieval result corresponding to the query statement may be obtained again, until the type of the knowledge conflict between the third result and the new retrieval result corresponding to the query statement obtained again is no longer the fact error, which may avoid that the fact error occurs in the output target response, and may further improve the accuracy of the target response determined.

In some embodiments, the question answering method based on a large model in the disclosure may be applied to at least one of the following scenarios: (1) an intelligent question answering system, (2) a medical diagnosis support system, (3) a legal consultation system, (4) a personalized recommendation system, and (5) an enterprise knowledge management system.

(1) In the intelligent question answering system, information sources from a plurality of fields are usually involved in user questions, and a conflict is easy to occur in the conventional models when dealing with knowledge from these different sources. With the question answering method based on a large model in the disclosure, the conflict between the parameter knowledge and the external knowledge may be effectively handled, it is ensured that the system provides more accurate and consistent answers when answering the user questions, and the reliability and user satisfaction of the intelligent question answering system is significantly improved.

(2) The medical diagnosis support system usually needs to combine historical medical records (internal knowledge) of patients and the latest medical research (external knowledge) to provide diagnostic recommendations. The knowledge from different sources may be inconsistent or conflicting, which affects the diagnostic accuracy. With the question answering method based on a large model in the disclosure, it is possible to accurately integrate internal medical records and external research data in the presence of knowledge conflicts, provide more accurate diagnostic recommendations, and enhance the reliability of medical decision support.

(3) The legal consultation system needs to handle regulations, cases, and expert opinions from different legal fields, and there may be conflicts between these information sources, resulting in inconsistent legal opinions. With the question answering method based on a large model in the disclosure, the system may better integrate legal knowledge from different sources, provide more unified and logically consistent legal recommendations, and help reduce a legal decision-making error caused by knowledge conflicts.

(4) The personalized recommendation system needs to combine historical behaviors of the users (internal knowledge) and current popular trends (external knowledge) in the field of e-commerce or content recommendation to make recommendations, a conflict between which may lead to poor recommendation results. With the question answering method based on a large model in the disclosure, the conflict between the historical behaviors and the current popular trends may be effectively resolved, and more accurate and personalized recommendation results may be provided, thereby improving user experience and platform conversion rates.

(5) The enterprise knowledge management system, i.e., the knowledge management system within the enterprise needs to integrate internal experience (parameter knowledge) and the latest trends outside the enterprise (external knowledge), a conflict between which may lead to a decision-making error or a confusion in knowledge management. With the question answering method based on a large model in the disclosure, the enterprise may better manage and integrate the internal and external knowledge resources, thereby ensuring the consistency and reliability of knowledge, and supporting strategic decision-making of the enterprise.

Figure 6:
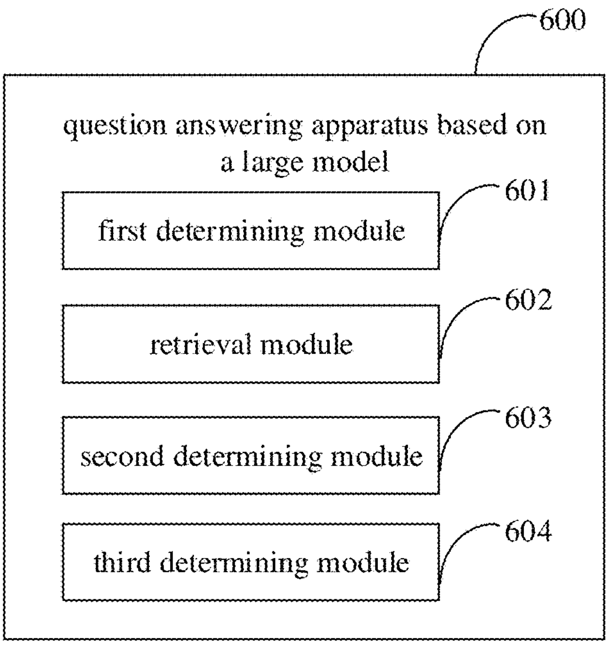
FIG. 6 is a structural diagram illustrating a question answering apparatus based on a large model according to an embodiment of the disclosure.

FIG. 6 is a structural diagram illustrating a question answering apparatus based on a large model according to an embodiment of the disclosure. As illustrated in FIG. 6, the question answering apparatus 600 includes a first determining module 601, a retrieval module 602, a second determining module 603 and a third determining module 604.

The first determining module 601 is configured to determine a first result corresponding to a query statement based on a first large model, in which the first result includes a first response corresponding to the query statement, a first response logic corresponding to the first response, and first context knowledge corresponding to the first response.

The retrieval module 602 is configured to determine at least one retrieval result corresponding to the query statement by retrieving in a database based on the query statement.

The second determining module 603 is configured to determine a type of a knowledge conflict between the first result and the retrieval result.

The third determining module 604 is configured to determine a target response corresponding to the query statement based on the first result, the retrieval result, and the type of the knowledge conflict.

In some embodiments, the type of the knowledge conflict includes at least one of a fact error or a semantic error.

In some embodiments, the second determining module 603 is configured to: obtain a definition and a reference example corresponding to the fact error, and a definition and a reference example corresponding to the semantic error; and determine the type of the knowledge conflict by inputting the first result, the retrieval result, the definition and the reference example corresponding to the fact error, and the definition and the reference example corresponding to the semantic error into a second large model.

In some embodiments, the third determining module 604 is configured to: determine a first weight corresponding to the first result and a second weight corresponding to the retrieval result; and in response to the type of the knowledge conflict being a semantic error, determine the target response by inputting the first result, the retrieval result, the type of the knowledge conflict, the definition and the reference example corresponding to the semantic error, the first weight corresponding to the first result, and the second weight corresponding to the retrieval result into a third large model.

In some embodiments, the third determining module 604 is configured to: determine the first weight corresponding to the first result based on a parameter amount corresponding to the first large model, in which the parameter amount is proportional to the first weight; and determine the second weight based on the first weight.

In some embodiments, the third determining module 604 is configured to: in response to the type of the knowledge conflict being a semantic error, determine the target response by inputting the first result, the retrieval result, the type of the knowledge conflict, and the definition and the reference example corresponding to the semantic error into a third large model.

In some embodiments, the first determining module 601 is configured to: obtain a preset number of output results by inputting the query statement into the first large model for a preset number of times, in which each of the output results includes a second response corresponding to the query statement, a second response logic corresponding to the second response, and second context knowledge corresponding to the second response; determine the first response by processing a preset number of second responses; determine the first response logic by processing a preset number of second response logics; and determine the first context knowledge by processing a preset number of pieces of second context knowledge.

In some embodiments, the first determining module 601 is configured to: determine the first response corresponding to the query statement, the first response logic, and the first context knowledge by inputting the preset number of second responses, the preset number of second response logics, and the preset number of pieces of second context knowledge into a fourth large model.

In some embodiments, the third determining module 604 is configured to: determine a first weight corresponding to the first result based on a preset number of confidence levels; obtain a second weight corresponding to the retrieval result; and in response to the type of the knowledge conflict being a semantic error, determine the target response by inputting the retrieval result, the first result, the type of the knowledge conflict, the definition and the reference example corresponding to the semantic error, the first weight corresponding to the first result, and the second weight corresponding to the retrieval result into a third large model.

In some embodiments, the apparatus further includes a processing module, configured to: in response to the type of the knowledge conflict being a fact error, determine a third result corresponding to the query statement based on the first large model again; determine at least one new retrieval result corresponding to the query statement by retrieving in a database based on the query statement again; and determine a type of a knowledge conflict between the third result and the new retrieval result until the type of the knowledge conflict is no longer the fact error.

It needs to be noted that the above explanations of the question answering method based on a large model also applies to the question answering apparatus based on a large model in the embodiments, which will not be repeated here.

In the embodiments of the disclosure, the first result corresponding to the query statement is first determined based on the first large model, in which the first result includes the first response corresponding to the query statement, the first response logic corresponding to the first response, and the first context knowledge corresponding to the first response; the at least one retrieval result corresponding to the query statement is then determined by retrieving in the database based on the query statement; the type of the knowledge conflict between the first result and the retrieval result is further determined; and the target response corresponding to the query statement is finally determined based on the first result, the retrieval result, and the type of the knowledge conflict. Thus, the first result corresponding to the query statement is determined based on the first large model, a retrieval result corresponding to the query statement is determined based on a database, and the first result and the retrieval result are processed to obtain the target response based on the type of the knowledge conflict between the first result and the retrieval result, which may avoid the influence of the knowledge conflict between the first result and the retrieval result on the target response and may thus improve the accuracy of the target response determined.

According to embodiments of the disclosure, the disclosure also provides an electronic device, a readable storage medium, and a computer program product.

Figure 7:
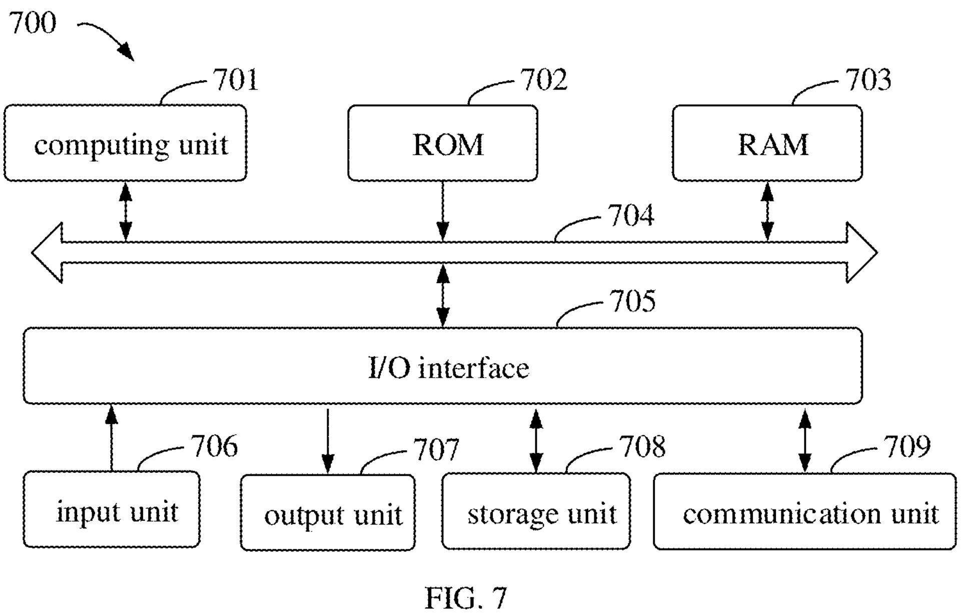
FIG. 7 is a block diagram illustrating an electronic device for implementing the question answering method based on a large model according to an embodiment of the disclosure.

Referring to FIG. 7, it is a block diagram illustrating an electronic device 700 according to an embodiment of the disclosure. The electronic device is intended to represent various types of digital computers, such as laptop computers, desktop computers, workstations, personal digital assistants, servers, blade servers, mainframe computers, and other suitable computers. The electronic device may also represent various types of mobile devices, such as personal digital assistants, cellular phones, smart phones, wearable devices, and other similar computing devices. The components shown herein, their connections and relations, and their functions are merely examples, which are not intended to limit the implementations of the disclosure described and/or required herein.

As illustrated in FIG. 7, the device 700 includes a computing unit 701, configured to execute various appropriate actions and processes according to a computer program stored in a read-only memory (ROM) 702 or a computer program loaded from a storage unit 708 to a random access memory (RAM) 703. In the RAM 703, various programs and data required for the device 700 may be stored. The computing unit 701, the ROM 702 and the RAM 703 may be connected with each other by a bus 704. An input/output (I/O) interface 705 is also connected to the bus 704.

The plurality of components in the device 700 are connected to the I/O interface 705, which include: an input unit 706, for example, a keyboard, a mouse; an output unit 707, for example, various types of displays, speakers; a storage unit 708, for example, a magnetic disk, an optical disk; and a communication unit 709, for example, a network card, a modem, a wireless transceiver. The communication unit 709 allows the device 700 to exchange information/data through a computer network such as Internet and/or various types of telecommunication networks with other devices.

The computing unit 701 may be various types of general and/or dedicated processing components with processing and computing abilities. Some examples of a computing unit 701 include but not limited to a central processing unit (CPU), a graphics processing unit (GPU), various dedicated artificial intelligence (AI) computing chips, various computing units on which a machine learning model algorithm is running, a digital signal processor (DSP), and any appropriate processor, controller, microcontroller, etc. The computing unit 701 executes various methods and processes as described above, for example, the question answering method based on a large model. For example, in some embodiments, the question answering method based on a large model may be further implemented as a computer software program, which is tangibly contained in a machine readable medium, such as the storage unit 708. In some embodiments, a part or all of the computer program may be loaded and/or installed on the device 700 via the ROM 702 and/or the communication unit 709. When the computer program is loaded on the RAM 703 and executed by the computing unit 701, one or more steps in the question answering method based on a large model may be performed as described above. Optionally, in other embodiments, the computing unit 701 may be configured to the question answering method based on a large model in other appropriate ways (for example, by virtue of a firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided for the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in combination with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, RAMs, ROMs, Electrically Programmable Read-Only-Memory (EPROM), fiber optics, Compact Disc Read-Only Memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user may provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein may be implemented in a computing system that includes context components (for example, a data server), or a computing system that includes middleware components (for example, an application server), or a computing system that includes front-end components (for example, a user computer with a graphical user interface or a web browser, through which the user may interact with the implementation of the systems and technologies described herein), or include such context components, intermediate computing components, or any combination of front-end components. The components of the system may be interconnected by any form or medium of digital data communication (e.g., a communication network). Examples of communication networks include: a Local Area Network (LAN), a Wide Area Network (WAN), the Internet and a blockchain network.

The computer system may include a client and a server. The client and server are generally remote from each other and interacting through a communication network. The client-server relation is generated by computer programs running on the respective computers and having a client-server relation with each other. The server may be a cloud server, also called as a cloud computing server or a cloud host, which is a hosting product in the cloud computing service system, solving the problems of difficult management and weak service scalability in a conventional physical host and a virtual private server (VPS) service. The server may be a server of a distributed system, or a server combined with a blockchain.

It should be understood that the various forms of processes shown above may be used to reorder, add or delete steps. For example, the steps described in the disclosure could be performed in parallel, sequentially, or in a different order, as long as the desired result of the technical solution disclosed in the disclosure is achieved, which is not limited herein.

In addition, the terms "first" and "second" are only used for the purpose of description and cannot be understood as indicating or implying relative importance or implying a number of technical features indicated. Therefore, the features that are limited to "first" and "second" may explicitly or implicitly include at least one of these features. In the disclosure, the meaning of "a plurality of" refers to at least two, such as two, three, etc., unless otherwise specified. In the disclosure, the words "if" and "in case that" used may be interpreted as "when" or "while" or "in response to determining . . . " or "in the case of . . . ".

The above specific embodiments do not constitute a limitation on the protection scope of the disclosure. Those skilled in the art should understand that various modifications, combinations, sub-combinations and substitutions may be made according to design requirements and other factors. Any modification, equivalent replacement and improvement made within the principle of the disclosure shall be included in the protection scope of the disclosure.

What is claimed is:

1. A computer-implemented question answering method based on a large model, applied in an intelligent question answering system or a personalized recommendation system, performed by an electronic device, the method comprising:

determining a first result corresponding to a query statement based on a first large model, wherein the first result comprises a first response corresponding to the query statement, a first response logic corresponding to the first response, and first context knowledge corresponding to the first response;

determining a retrieval result corresponding to the query statement by retrieving in a database based on the query statement;

determining a type of a knowledge conflict between the first result and the retrieval result; and determining a target response corresponding to the query statement based on the first result, the retrieval result, and the type of the knowledge conflict;

wherein determining the target response corresponding to the query statement, comprises:

determining a first weight corresponding to the first result and a second weight corresponding to the retrieval result; and in response to the type of the knowledge conflict being a semantic error, determining the target response by inputting the first result, the retrieval result, the type of the knowledge conflict, the definition and the reference example corresponding to the semantic error, the first weight corresponding to the first result, and the second weight corresponding to the retrieval result into a third large model;

wherein determining the first weight corresponding to the first result and the second weight corresponding to the retrieval result, comprises:

determining the first weight corresponding to the first result based on a parameter amount corresponding to the first large model, wherein the parameter amount is proportional to the first weight; and determining the second weight based on the first weight;

wherein determining the first result corresponding to the query statement based on the first large model, comprises:

obtaining a preset number of output results by inputting the query statement into the first large model for a preset number of times, wherein each of the output results comprises a second response corresponding to the query statement, a second response logic corresponding to the second response, and second context knowledge corresponding to the second response;

determining the first response by processing a preset number of second responses;

determining the first response logic by processing a preset number of second response logics; and determining the first context knowledge by processing a preset number of pieces of second context knowledge.

2. The method according to claim 1, wherein the type of the knowledge conflict comprises at least one of a fact error or a semantic error.

3. The method according to claim 2, wherein determining the type of the knowledge conflict between the first result and the retrieval result, comprises:

obtaining a definition and a reference example corresponding to the fact error, or a definition and a reference example corresponding to the semantic error; and determining the type of the knowledge conflict by inputting the first result, the retrieval result, the definition and the reference example corresponding to the fact error, and the definition and the reference example corresponding to the semantic error into a second large model.

4. The method according to claim 1, wherein determining the target response corresponding to the query statement, comprises:

in response to the type of the knowledge conflict being a semantic error, determining the target response by inputting the first result, the retrieval result, the type of the knowledge conflict, and the definition and the reference example corresponding to the semantic error into a third large model.

5. The method according to claim 1, wherein after obtaining the preset number of output results by inputting the query statement into the first large model for the preset number of times, the method further comprises:

determining the first response corresponding to the query statement, the first response logic, and the first context knowledge by inputting the preset number of second responses, the preset number of second response logics and the preset number of pieces of second context knowledge into a fourth large model.

6. The method according to claim 1, wherein the output result comprises a confidence level corresponding to the second response, and determining the target response corresponding to the query statement, comprises:

determining a first weight corresponding to the first result based on a preset number of confidence levels;

obtaining a second weight corresponding to the retrieval result; and in response to the type of the knowledge conflict being a semantic error, determining the target response by inputting the retrieval result, the first result, the type of the knowledge conflict, the definition and the reference example corresponding to the semantic error, the first weight corresponding to the first result, and the second weight corresponding to the retrieval result into a third large model.

7. The method according to claim 1, further comprising:

in response to the type of the knowledge conflict being a fact error, determining a third result corresponding to the query statement based on the first large model again;

determining a new retrieval result corresponding to the query statement by retrieving in a database based on the query statement again; and determining a type of a knowledge conflict between the third result and the new retrieval result until the type of the knowledge conflict between the third result and the new retrieval result is no longer the fact error.

8. An electronic device, applied in an intelligent question answering system or a personalized recommendation system, comprising a processor; and a memory communicatively coupled to the processor and storing instructions executable by the processor, wherein the processor is configured to:

determine a first result corresponding to a query statement based on a first large model, wherein the first result comprises a first response corresponding to the query statement, a first response logic corresponding to the first response, and first context knowledge corresponding to the first response;

determine a retrieval result corresponding to the query statement by retrieving in a database based on the query statement;

determine a type of a knowledge conflict between the first result and the retrieval result; and determine a target response corresponding to the query statement based on the first result, the retrieval result, and the type of the knowledge conflict;

wherein the processor is further configured to perform one of:

determining a first weight corresponding to the first result and a second weight corresponding to the retrieval result; and in response to the type of the knowledge conflict being a semantic error, determining the target response by inputting the first result, the retrieval result, the type of the knowledge conflict, the definition and the reference example corresponding to the semantic error, the first weight corresponding to the first result, and the second weight corresponding to the retrieval result into a third large model; or in response to the type of the knowledge conflict being a semantic error, determining the target response by inputting the first result, the retrieval result, the type of the knowledge conflict, and the definition and the reference example corresponding to the semantic error into a third large model;

wherein the processor is further configured to:

determine the first weight corresponding to the first result based on a parameter amount corresponding to the first large model, wherein the parameter amount is proportional to the first weight; and determine the second weight based on the first weight;

wherein determining the first result corresponding to the query statement based on the first large model, comprises:

obtaining a preset number of output results by inputting the query statement into the first large model for a preset number of times, wherein each of the output results comprises a second response corresponding to the query statement, a second response logic corresponding to the second response, and second context knowledge corresponding to the second response;

determining the first response by processing a preset number of second responses;

determining the first response logic by processing a preset number of second response logics; and determining the first context knowledge by processing a preset number of pieces of second context knowledge.

9. The electronic device according to claim 8, wherein the type of the knowledge conflict comprises at least one of a fact error or a semantic error.

10. The electronic device according to claim 9, wherein the processor is further configured to:

obtain a definition and a reference example corresponding to the fact error, and a definition and a reference example corresponding to the semantic error; and determine the type of the knowledge conflict by inputting the first result, the retrieval result, the definition and the reference example corresponding to the fact error, and the definition and the reference example corresponding to the semantic error into a second large model.

11. The electronic device according to claim 8, wherein the processor is further configured to:

obtain a preset number of output results by inputting the query statement into the first large model for a preset number of times, wherein each of the output results comprises a second response corresponding to the query statement, a second response logic corresponding to the second response, and second context knowledge corresponding to the second response;

determine the first response by processing a preset number of second responses;

determine the first response logic by processing a preset number of second response logics; and determine the first context knowledge by processing a preset number of pieces of second context knowledge.

12. The electronic device according to claim 11, wherein the processor is further configured to:

determine the first response corresponding to the query statement, the first response logic, and the first context knowledge by inputting the preset number of second responses, the preset number of second response logics and the preset number of pieces of second context knowledge into a fourth large model.

13. The electronic device according to claim 11, wherein the processor is further configured to:

determine a first weight corresponding to the first result based on a preset number of confidence levels;

obtain a second weight corresponding to the retrieval result; and in response to the type of the knowledge conflict being a semantic error, determine the target response by inputting the retrieval result, the first result, the type of the knowledge conflict, the definition and the reference example corresponding to the semantic error, the first weight corresponding to the first result, and the second weight corresponding to the retrieval result into a third large model.

14. The electronic device according to claim 8, wherein the processor is further configured to: in response to the type of the knowledge conflict being a fact error, determine a third result corresponding to the query statement based on the first large model again;

determine a new retrieval result corresponding to the query statement by retrieving in a database based on the query statement again; and determine a type of a knowledge conflict between the third result and the new retrieval result until the type of the knowledge conflict between the third result and the new retrieval result is no longer the fact error.

15. A non-transitory computer readable storage medium storing computer instructions, applied in an intelligent question answering system or a personalized recommendation system, wherein the computer instructions are caused to enable a computer to perform a computer-implemented question answering method based on a large model, the method comprising:

determining a first result corresponding to a query statement based on a first large model, wherein the first result comprises a first response corresponding to the query statement, a first response logic corresponding to the first response, and first context knowledge corresponding to the first response;

determining a retrieval result corresponding to the query statement by retrieving in a database based on the query statement;

determining a type of a knowledge conflict between the first result and the retrieval result; and determining a target response corresponding to the query statement based on the first result, the retrieval result, and the type of the knowledge conflict;

wherein determining the target response corresponding to the query statement, comprises:

determining a first weight corresponding to the first result and a second weight corresponding to the retrieval result; and in response to the type of the knowledge conflict being a semantic error, determining the target response by inputting the first result, the retrieval result, the type of the knowledge conflict, the definition and the reference example corresponding to the semantic error, the first weight corresponding to the first result, and the second weight corresponding to the retrieval result into a third large model;

wherein determining the first weight corresponding to the first result and the second weight corresponding to the retrieval result, comprises:

determining the first weight corresponding to the first result based on a parameter amount corresponding to the first large model, wherein the parameter amount is proportional to the first weight; and determining the second weight based on the first weight;

wherein determining the first result corresponding to the query statement based on the first large model, comprises:

obtaining a preset number of output results by inputting the query statement into the first large model for a preset number of times, wherein each of the output results comprises a second response corresponding to the query statement, a second response logic corresponding to the second response, and second context knowledge corresponding to the second response;

determining the first response by processing a preset number of second responses;

determining the first response logic by processing a preset number of second response logics; and determining the first context knowledge by processing a preset number of pieces of second context knowledge.

* * * * *